March 26, 1957     T. C. WHITING     2,786,712
COUNTERBALANCED DOOR FOR CARGO CARRYING VEHICLE BODIES
Filed Nov. 29, 1954
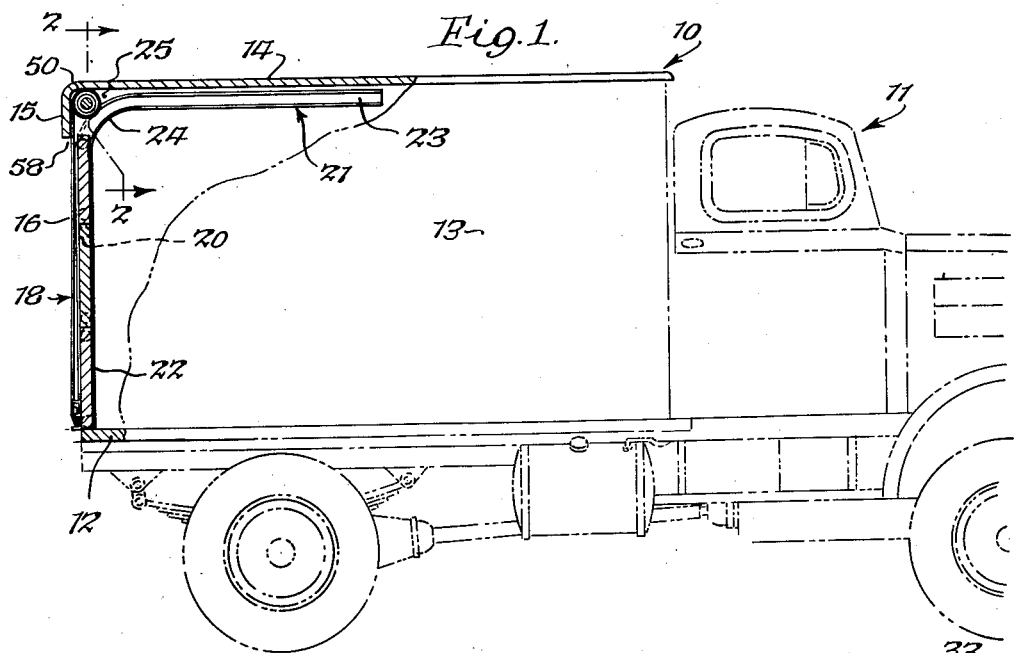
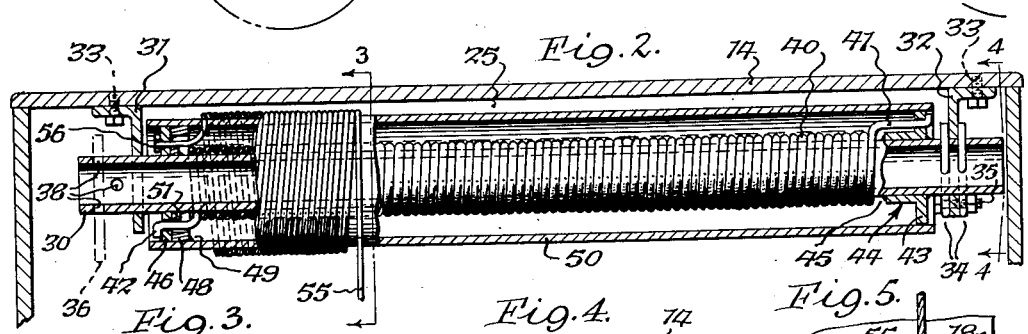
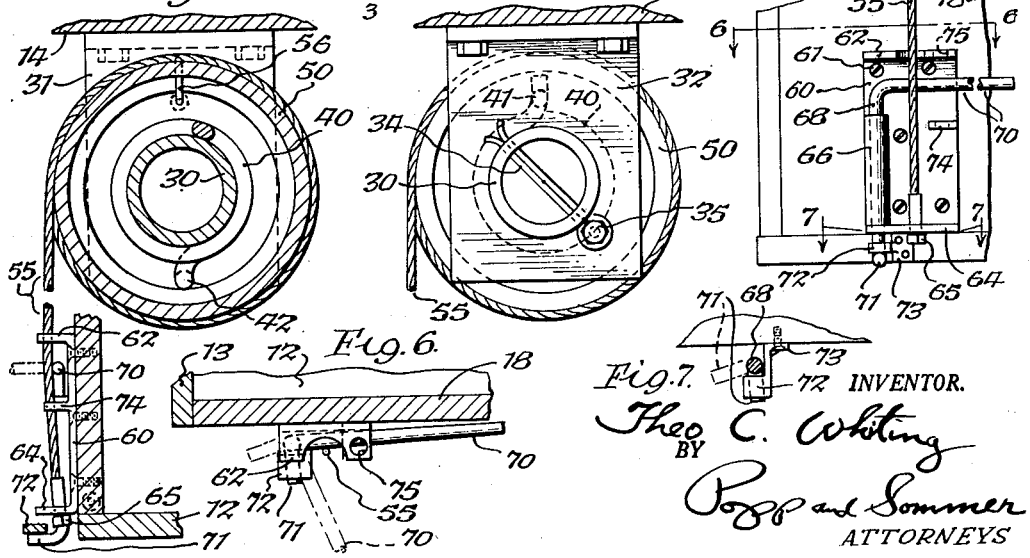
INVENTOR.
Theo C. Whiting
BY
Popp and Sommer
ATTORNEYS United States Patent Office 2,786,712
Patented Mar. 26, 1957

2,786,712

COUNTERBALANCED DOOR FOR CARGO CARRYING VEHICLE BODIES

Theo C. Whiting, Akron, N. Y.

Application November 29, 1954, Serial No. 471,786

3 Claims. (Cl. 296—106)

This invention relates to counterbalanced, vertically movable doors for cargo carrying trucks and trailers where the door is guided by a pair of side tracks, each having a vertical section alongside the doorway and connecting with a horizontal section disposed under the ceiling of the truck or trailer body through a curved part.

One of the principal objects of the present invention is to provide such a counterbalancing device which is wholly housed within the body of the truck or trailer but at the same time does not occupy any space that could otherwise be occupied by the payload.

Another object is to provide such a counterbalancing device which is inconspicuous and at the same time will adequately counterbalance the weight of the door.

Another object is to provide such a counterbalancing device, the effect of which is proportional to the increasing effective weight of the door as it descends.

Another object is to provide such a counterbalancing device which can have an adjustable amount of windup thereby to adapt it to doors of different sizes.

Another object is to provide such a counterbalancing device, the parts of which are adequately protected against accidental injury, as from a shift of the cargo.

Another aim is to provide such a counterbalancing device which is extremely inexpensive in construction and operation and which will stand up under conditions of severe and constant use without getting out of order or requiring repairs.

Another object is to provide such a counterbalancing device having a latch which is yieldingly held closed by tension members of the device.

Other objects and advantages of the invention will be apparent from the following description and drawings in which:

Fig. 1 is a vertical, longitudinal section through the rear end of a truck body having a rear door counterbalanced in accordance with the present invention, the forepart of the truck body and its chassis being shown in phantom.

Fig. 2 is an enlarged, fragmentary, vertical section taken generally on line 2—2, Fig. 1.

Figs. 3 and 4 are fragmentary cross sections taken generally on the corresponding lines of Fig. 2.

Fig. 5 is a fragmentary rear elevational view of the truck body and its closed door, viewed from the lower left of Fig. 3.

Figs. 6 and 7 are fragmentary, horizontal sections taken on the correspondingly numbered lines of Fig. 5.

The numeral 10 represents the body of a truck 11, this body having the usual floor or platform 12, side walls 13 and roof 14, the rear end of which roof is shown as extending downwardly, as indicated at 15, to provide the upper limit of the doorway 16 at the rear of the truck body and which doorway extends from the floor to the bottom edge of the downward extension 15 and from one side wall 13 to the other. The cargo is loaded into the truck body and removed therefrom through this doorway.

In transit, the doorway 16 is closed by a vertically movable door 18 which is shown as made of three rectangular sections hinged together and comprising a top section, an intermediate section and a bottom section. At their four corners, these sections are each provided with conventional rollers 20 which project into channel-shaped, parallel side tracks 21 mounted on the side walls 13 of the truck. Each of these tracks 21 includes a vertical part 22 extending along the corresponding side of the opening 16, a horizontal part 23 arranged immediately under the roof 14 and a curved portion 24 which connects the portions 22 and 23 of each rail and guides the rollers 20 so that the several sections 19 of the door follow the track when raised from the vertical closed position shown in Fig. 1 and so that in the open position of the door, the several sections thereof are arranged horizontally immediately under the roof 14 and supported by the horizontal parts 23 of the tracks.

It will particularly be noted that with above conventional construction of truck body, track and door, there is a space 25 which cannot be occupied by any part of the cargo or payload of the truck and which space also is not traversed by the door 18. This space is defined by the rear end of the roof 14, its downward extension 15, and the curved part 24 of the two tracks 21. This space 25 cannot be occupied by the cargo since otherwise the door 18 could not be opened and closed. Also this space cannot be traversed by the door because a curved track section 24 of substantial extent is required to effect transition of the door from the horizontal parts 23 to the vertical parts 22 of the tracks 21 and vice versa. In the practice of the present invention, this space 25 is utilized to house the counterbalancing device forming the subject of the present invention.

As best shown in Fig. 2, the counterbalancing device includes a central rod in the form of a tube 30 which is supported by L-shaped brackets or hangers 31 and 32 so as to be parallel with and in closely spaced relation to the roof 14 and its downward extension 15. Accordingly, this rod 30 occupies the space 25 and it is supported by extending through openings provided in the brackets or hangers 31 and 32 and which brackets or hangers are shown as secured by screws 33 to the roof of the truck body. This rod is held stationary and for this purpose has a pair of cotter pins 34 extending diametrically therethrough on opposite sides of the hanger or bracket 32, as best shown in Figs. 2 and 4. The heads of these cotter pins are secured to the hanger or bracket 32 by a bolt 35 and since these cotter pins 34 are bolted to the hanger or bracket 32 and extend through the rod 30, it will be seen that these cotter pins prevent rotation of the rod 30 as well as endwise movement of the rod.

It is important, as hereinafter described, to adjust the degree of pretensioning or windup of the counterbalancing device and to this end the rod 30 is capable of being fixed in different positions of rotation. When adjusting of the degree of windup is required, the bolt 35 is removed and a pair of bars or pins 36 are inserted through two pairs of holes 38 in the opposite end of the rod 30. By manipulation of the bars 36, the rod 30 can be rotated any desired number of times in the required direction following which the bolt 35 can be replaced to extend through the heads of the cotter pins 34 and the hanger or bracket 32.

The rod 30 is surrounded by a helical spring 40, one end 41 of which is arranged adjacent the bracket or hanger 32 while the other end 42 of this spring is arranged adjacent the bracket or hanger 31. The end 41 extends through an opening in the annular flange 43 of a collar 44, the hub of which is welded to the rod 30 as indicated at 45. The opposite end 42 of the spring 40 extends through an opening in an annular flange or collar 46 which is welded to a ring 48, the latter being in turn welded, as indicated at 49 in the bore of a tube or drum 50. This tube or drum 50 is journalled on the perimeter of the flange 43 welded to the stationary rod 30 and its flange or collar 46 is journalled on the opposite end of this stationary rod 30. A small thrust collar 51 is welded on the rod 30 and engages the inner face of the collar 46 and acts as a thrust shoulder to resist the thrust produced by the action of the spring 40.

The outer tube 50 forms a drum on which a counterbalancing cable 55 winds and unwinds as the door is opened and closed. One end 56 of this cable extends through the outer tube or drum 50 and is anchored in the collar 46. The other end of this cable extends downwardly through the space 58 between the door 18 and the downward extension 15 of the roof 14 and is secured at its lower end to the bottom of the door as follows:

The numeral 60 represents a metal plate secured by screws 61 to the outer face of the lowest section 19 of the door 18 near the bottom thereof. This plate has an upper flange 62 which is centrally indented to receive the cable 55 as best shown in Figs. 5 and 6. This plate also has a lower flange 64 in which the end of the cable 55 is anchored by any suitable connector 65. This plate also has welded thereon a vertical, cylindrical tube 66 in which the vertical rod 68 is journalled, this vertical rod also extending through an opening in the lower flange 64 of the plate. The rod 68 is bent at right angles at its upper end to provide an operating handle 70 and is bent at its lower end at right angles to provide a latch 71. The latch 71 extends at right angles to the handle 70 and when the handle 70 is arranged against the rear face of the door 18, the latch 71 is engaged under a catch 72, the base 73 of which catch is secured to the end of the floor 12 of the truck.

A feature of the invention is that the cable 55 bears against the handle 70 so as to yieldingly hold it against the plate 60, in which position, when the door 18 is closed, the latch 71 is engaged with the catch 72. The plate 60 can also be provided with a projection 74 and this projection can be provided with a hole alining with a hole 75 provided in the upper flange 62 of the plate 60. These holes are adapted to receive a conventional freight car door seal (not shown), the removal of or tampering with which indicates that unauthorized persons have been attempting to get at the sealed cargo.

In the operation of the counterbalanced door forming the subject of the invention, assuming the door 18 to be in the closed position shown in Fig. 1, the driver first breaks the seal (not shown) threaded through the apertured lug 74 and hole 75 and draws the handle 70 toward him. This displaces the taut stretch of cable 55 toward him and also swings the latch 71 out from under the catch 72 so that by lifting upon the handle 70, the door 18 is started in its upward movement. As soon as he releases the handle 70, the tension of the cable 55 draws it back against its supporting plate 60 and where it cannot injure anyone in the continued upward, or return downward, movement of the door 18.

The driver then seizes the lower end of the door 18 and lifts the door, the rollers 20 of the successive door sections 19 traveling around the curved parts 24 of the side tracks 21 and onto the horizontal parts 23 of these side tracks. In the latter position, the doorway 16 is fully opened and the cargo can be removed from the truck body.

The lifting of the door 18 is facilitated by the lifting device attached to the cable 55. This cable is arranged against the outer face of the door 18 in the closed position thereof and extends upwardly through the crack or space 58 to the drum 50 on which the cable winds. This drum is journalled on the periphery of the flange 43 at one end of the stationary rod 30 and its collar 46 is journalled on the opposite end of the stationary rod 30. Since the helical windup spring 40 is anchored at its opposite ends in this flange 43 fixed to the rod 30 and the collar 46 fixed to the drum 50, and since this spring has been provided with the requisite degree of windup, the spring exerts a counterbalancing force on the closed door 18, tending to rotate the drum 50 in the direction to wind the cable 55 upon this drum. As the door rises and as a greater part of this door is supported on the horizontal section 23, the force of the windup spring 40 diminishes. Accordingly, the effect of the spring is diminished with the reduction in the load which it counterbalances.

After the cargo is removed and the truck body reloaded, the operator seizes the rear end of the door 18 and pulls it downwardly, thereby to cause the several sections 19 thereof to traverse the curved parts 24 of the side tracks 21 and enter the vertical parts 22 thereof. As the several sections of the door 18 move downwardly along the vertical parts 22 of the side tracks, the door draws upon the cable 55 causing it to turn the drum 50 and thereby rewind the helical spring 40. When the door approaches its fully closed position, the driver pulls the handle 70 toward him thereby displacing the cable 55 toward him against the resistance of the tension of this cable. In this position of the handle 70, the catch of the latch 71 at the lower end of its vertical rod 68 is in position to clear the catch 72. Accordingly, the door can be fully closed following which the driver releases the handle 70. When so released, the tension of the displaced cable 55 draws the handle 70 against the plate 60 and also swings the latch 71 under the catch 72. Accordingly, the cable 55 yieldingly holds the door firmly latched until deliberately released by the driver in pulling the handle 70 toward him.

If required, the cargo can be sealed by passing a conventional car door seal through the apertured lug 74 and hole 75, this preventing the handle 70 from being drawn forwardly without breaking the seal.

If a greater degree of counterbalancing is required, a pair of bars or pins 36 can be placed in the two pairs of holes 38 and the bolt 35 can be withdrawn. By manipulation of the two pins or bars 36, the central rod 30 can be rotated to the position to provide the necessary degree of pretensioning or windup of the spring 40. Thereafter, the bolt 35 can be replaced.

From the foregoing, it will be seen that the present invention provides a very simple and effective counterbalance for the vertical moving doors of trucks and which in particular is characterized by the counterbalancing spring mechanism being arranged in the space 25 which space cannot be occupied by the cargo and also cannot be in the path of the door. Accordingly, the usable volume of truck or trailer body is not reduced in the practice of the present invention. It will further be seen that by arranging the cable on the outside of the door, it does not interfere with the movement of the door to its open horizontal position and at the same time, the cable is utilized to hold the door latched.

I claim:

1. In a cargo carrying vehicle body having a floor, side walls and a roof having a rear downwardly extending portion defining with said side walls and floor a doorway, a pair of parallel tracks severally arranged at each side of said body and each track including a vertical part arranged alongside of said doorway, a horizontal part under said roof and extending along the corresponding side wall and a curved part connecting each vertical part with its horizontal part and a door having rollers riding and guided by said tracks and said door being movable from a closed vertical position in said vertical parts of said tracks upwardly and around said curved parts to said horizontal parts of said tracks where said door is in a horizontal position; the combination therewith of means for counterbalancing said door in its movement along said tracks and latching said door in its closed position, comprising a generally horizontal rod fixed to said body generally parallel with said downwardly extending portion of said roof and arranged in the space defined by said roof, said downwardly extending part of said roof and said curved parts of said tracks, a drum journalled on said rod, a helical spring within said drum around said rod and having one end fast to said rod and its other end fast to said drum and a cable wound around said drum and having one end fast to said drum, the other end of said cable extending downwardly through the space between said downwardly extending part of said roof and said door and along the exterior face of the door when closed, means fastening said other end of said cable to the lower part of said door a catch fast to the exterior of said body adjacent said cable, a latch movably mounted on said door for movement into and out of engagement with said catch in the closed position of said door, a swingable handle arranged between said cable and door, and means operatively connecting said latch and handle and operative to hold said latch engaged with said catch when said handle is held by said cable against said door.

2. The combination set forth in claim 1 wherein said means operatively connecting said latch and handle comprises a vertical tube fast to said door and a vertical rod journalled in said tube with said handle formed as a horizontal extension of the upper end of said rod and said latch as a horizontal extension of the lower end of said rod.

3. In a cargo carrying vehicle body having a floor, side walls and a roof having a rear downwardly extending portion defining with said side walls and floor a doorway, a pair of parallel tracks severally arranged at each side of said body and each track including a vertical part arranged alongside of said doorway, a horizontal part under said roof and extending along the corresponding side wall and a curved part connecting each vertical part with its horizontal part and a door having rollers riding and guided by said tracks and said door being movable from a closed vertical position in said vertical parts of said tracks upwardly and around said curved parts to said horizontal parts of said tracks where said door is in a horizontal position; the combination therewith of means for counterbalancing said door in its movement along said tracks, comprising a generally horizontal rod fixed at its opposite ends to said body adjacent said side walls to extend generally parallel with said downwardly extending portion of said roof and to be arranged in the space defined by said roof, said downwardly extending part of said roof and said curved parts of said tracks, a cylindrical drum journalled at its opposite ends on the opposite extremities of said rod, a helical spring within said cylindrical drum around said rod and having one end fast to said rod and its other end fast to said cylindrical drum and a cable having successive convolutions wound around the periphery of said cylindrical drum to have a helical lead extending lengthwise of the drum and having one end fast to one end of said drum, the other end of said cable extending downwardly through the space between said downwardly extending part of said roof and said door and into and along said doorway along the exterior face of the door when closed and means fastening said other end of said cable to the lower part of said door, whereby the upper end of said cable can travel any required distance lengthwise of said drum as said door is opened and closed thereby to prevent jamming of said cable between said downwardly extending part of said roof and said door.

References Cited in the file of this patent

UNITED STATES PATENTS

| | | |
|---|---|---|
| 1,004,208 | Schroyer | Sept. 26, 1911 |
| 2,330,670 | Black | Sept. 28, 1943 |